US005465910A

United States Patent [19]

Hall et al.

[11] Patent Number: 5,465,910

[45] Date of Patent: Nov. 14, 1995

[54] OVERMOLDED COVER FOR FUEL INJECTOR POWER GROUP AND METHOD

[75] Inventors: Bryan C. Hall; David P. Wieczorek, both of Newport News; Gordon H. Wyant, Hampton; Ramond T. Wildeson, Yorktown; Debora E. Nally, Williamsburg, all of Va.

[73] Assignee: Siemens Automotive Corporation, Auburn Hills, Mich.

[21] Appl. No.: 292,459

[22] Filed: Aug. 18, 1994

[51] Int. Cl.[6] .......... F16K 31/06

[52] U.S. Cl. .......... 239/585.4; 251/129.21

[58] Field of Search .......... 239/585.1–585.5; 251/129.21, 129.18, 129.15

[56] References Cited

U.S. PATENT DOCUMENTS 4,984,744 1/1991 Babitzka et al. .......... 239/585.4
5,165,656 11/1992 Maier et al. .......... 239/585.4 X
5,178,362 1/1993 Vogt et al. .......... 239/585.1 X
5,207,387 5/1993 Bergstrom .......... 239/585.4
5,217,204 6/1993 Maier et al. .......... 251/129.21 X

*Primary Examiner*—Andres Kashnikow
*Assistant Examiner*—Lesley D. Morris
*Attorney, Agent, or Firm*—Russel C. Wells

[57] ABSTRACT

A non-metallic overmold covers the solenoid and an adjoining portion of a valve body shell, leaving another portion of the valve body shell exposed. This exposed portion contains a circumferential groove in its outside surface that is held by a portion of a mold that molds the cover. This prevents the inside surface of the valve body shell from having to be contacted.

5 Claims, 2 Drawing Sheets

FIG.3
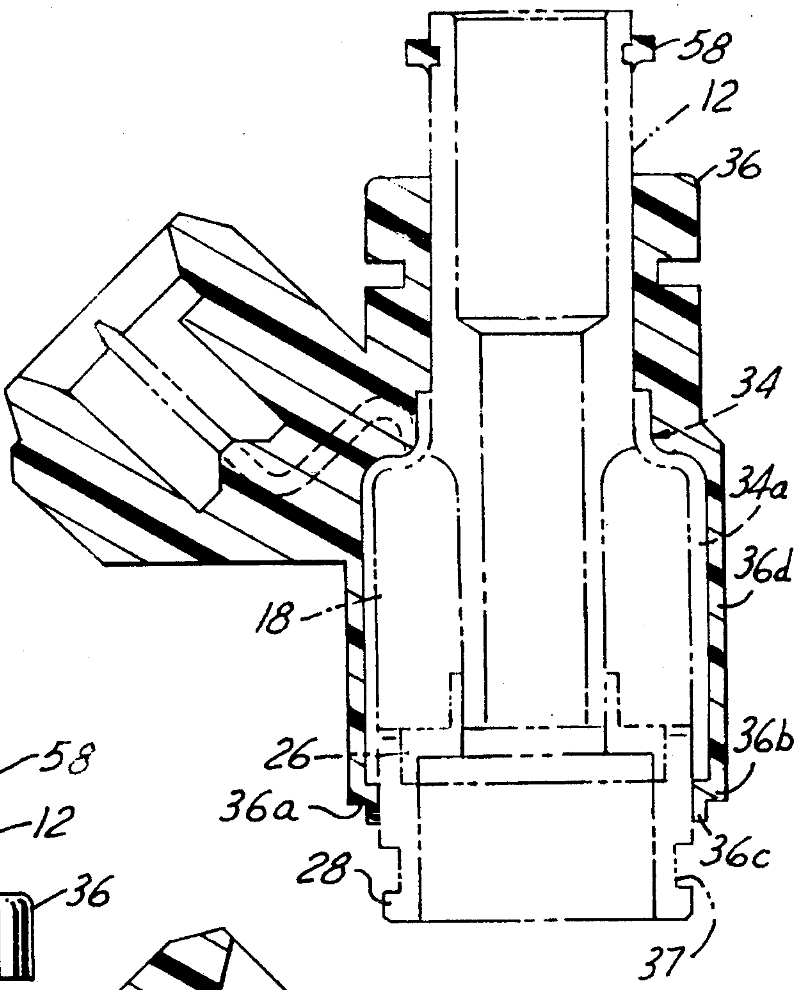
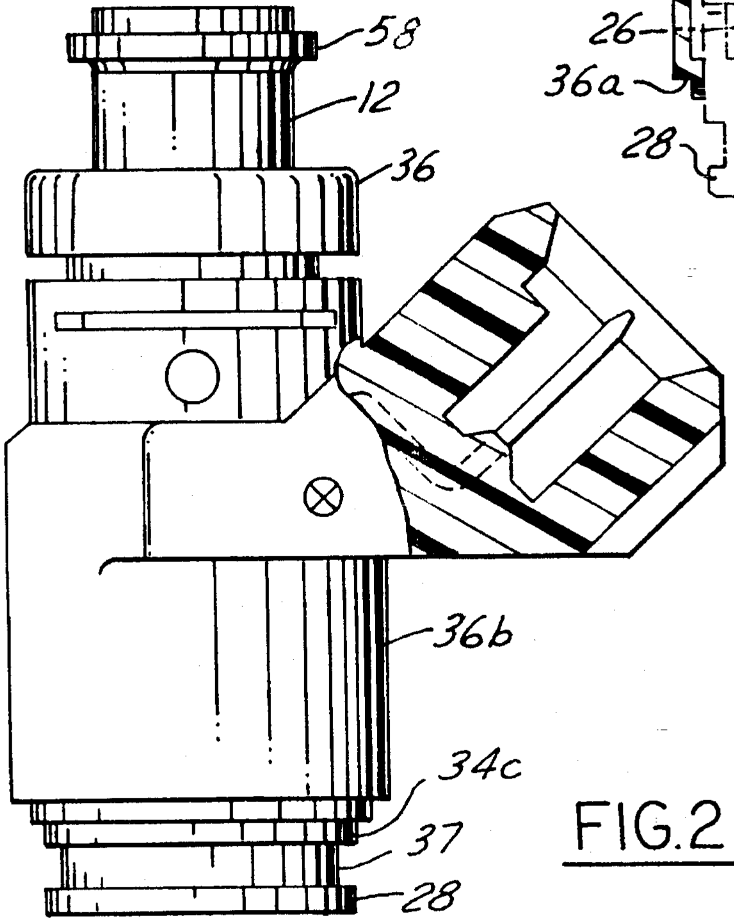
FIG.2

OVERMOLDED COVER FOR FUEL INJECTOR POWER GROUP AND METHOD

FIELD OF THE INVENTION

This invention relates to electrically operated fuel injectors that are used in fuel injection systems of internal combustion engines.

BACKGROUND AND SUMMARY OF THE INVENTION

Traditional fuel injectors have a molded plastic surround associated with the electrical terminals of the power group to form an electrical connector. Some fuel injectors also have some overmold extend axially down the outer surface of the power group, for aesthetics and/or for ease of part identification and/or for encapsulating internal components. Historically, most injector designs have coated exposed metal surfaces of the power group and valve group with a plating or paint to meet the requirements that the injector be able to withstand numerous hours of a corrosive salt spray environment and still display no visible signs of rust.

Plating and painting require careful process control to insure that an even thickness of plating/painting occurs only in the areas desired: surface preparation and cleanliness can be a concern, and uneven covering of the surface results in failure to protect from corrosion. If the plating is applied prior to assembly of subcomponents, contamination of the interior of the injector can result in failed durability or leaking units. Plating or painting after subassembly means subjecting the final calibrated and flowed injector to mishandling or contamination issues which could also result in failed units. Additionally, one area of an injector where it is typically difficult to insure corrosion protection is the mating area between the power group and the valve group.

Some recent fuel injectors have utilized overmold over the entire outer surface of the power group for corrosion protection. Although this is a beneficial solution for elimination of the plating and painting concerns, it has two main drawbacks. The overmolding requires that the outer diameter of the injector be increased. This is contrary to recent trends in engine compartment down-sizing which have dictated that any noticeable increase in the outer diameter of a component will not be acceptable. The holding location for the overmold process typically requires that the inner surface of the injector be contacted. This creates the potential for creation or retention of contamination which will be internal to the injector after the assembly process, possibly resulting in leaks, erratic flow or a durability flow shift.

The present invention is related to a power group construction and method that avoids contacting the inner surface of the power group during the process of creating the overmold. In the disclosed embodiment, this occurs by providing a stepped outer diameter at the lower end of the outside surface of the power group.

Various features, advantages and the inventive aspects will be seen in the ensuing description and claims which are accompanied by drawings that disclose a presently preferred exemplary embodiment of the invention according to the best mode contemplated at the present time for carrying out the invention.

BRIEF DESCRIPTION OF THE DRAWINGS

FIG. 2 is a longitudinal view of the power group of the fuel injector.

FIG. 3 is a cross-sectional view of the overmold by itself with certain associated parts of the fuel injector shown in phantom outline.

DESCRIPTION OF THE PREFERRED EMBODIMENT

Figure 1:
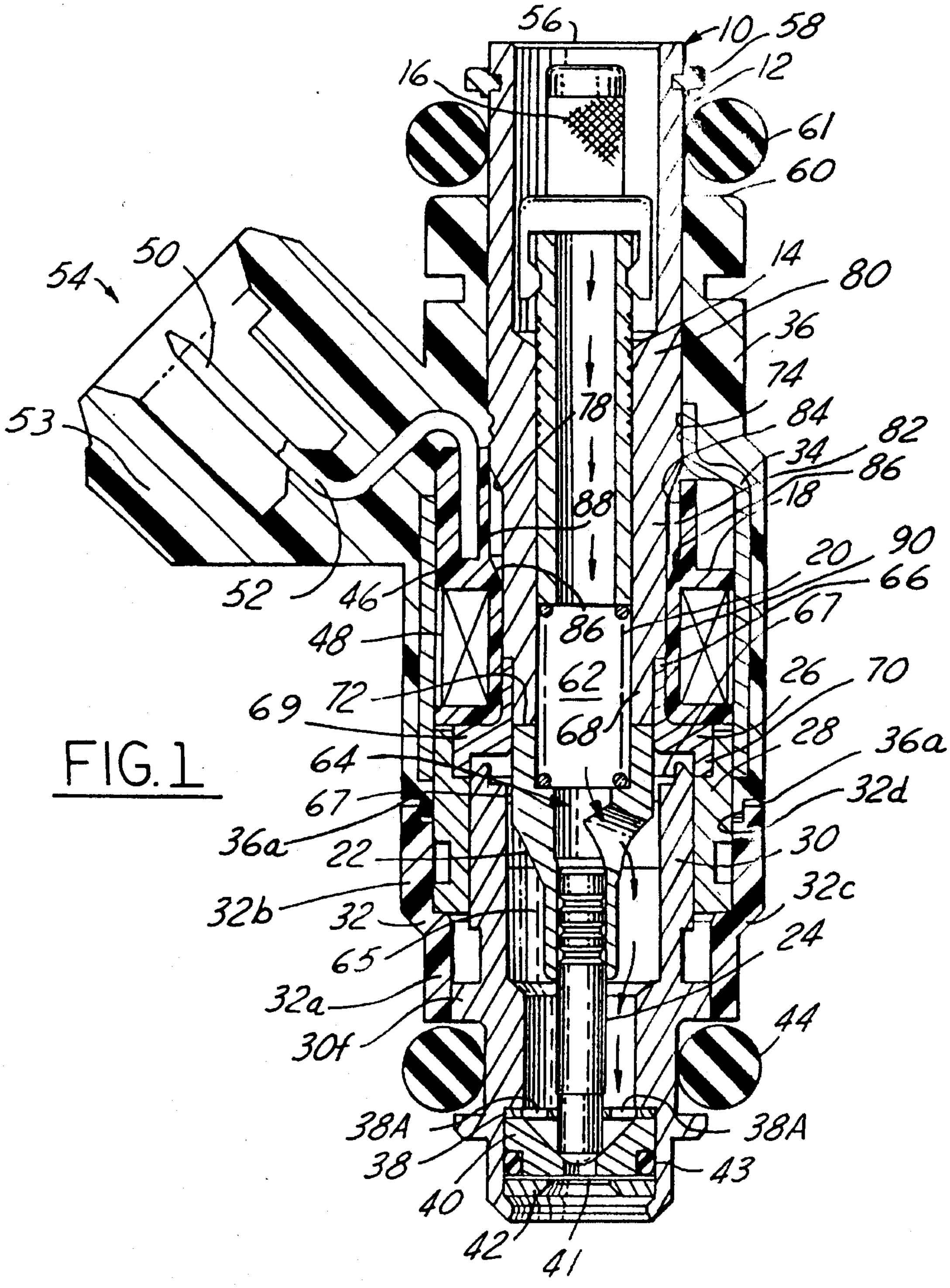
FIG. 1 is a longitudinal cross-sectional view through an exemplary fuel injector embodying principles of the present invention.

FIG. 1 shows an exemplary fuel injector 10 comprising a number of parts including a fuel inlet tube 12, an adjustment tube 14, a filter assembly 16, a coil assembly 18, a coil spring 20, an armature 22, a needle valve 24, a non-magnetic shell 26, a valve body shell 28, a valve body 30, a plastic shell 32, a coil assembly housing 34, a non-metallic cover 36, a needle guide member 38, a valve seat member 40, a thin disk orifice member 41, a backup retainer member 42, a small O-ring seal 43, and a large O-ring seal 44.

Parts 38, 40, 41, 42, and 43 form a stack that is disposed at the nozzle end of fuel injector 10, as shown in a number of commonly assigned patents, such as U.S. Pat. No. 5,174,505. Armature 22 and needle valve 24 are joined together to form an armature/needle valve assembly. Coil assembly 18 comprises a plastic bobbin 46 on which an electromagnetic coil 48 is wound. Respective terminations of coil 48 connect to respective terminals 50, 52 that are shaped and, in cooperation with a surround 53 formed as an integral part of cover 36, form an electrical connector 54 for connecting the fuel injector to an electronic control circuit (not shown) that operates the fuel injector.

Fuel inlet tube 12 is ferromagnetic and comprises a fuel inlet opening 56 at the exposed upper end. A ring 58 that is disposed around the outside of fuel inlet tube 12 just below fuel inlet opening 56 cooperates with an end surface 60 of cover 36 and the intervening O.D. of tube 12 to form a groove for an O-ring seal 61 that is typically used to seal the fuel injector inlet to a cup, or socket, in an associated fuel rail (not shown). The lower O-ring 44 is for providing a fluid-tight seal with a port in an engine induction intake system (not shown) when the fuel injector is installed on an engine. Filter assembly 16 is fitted to the open upper end of adjustment tube 14 to filter any particulate material larger than a certain size from fuel entering through inlet opening 56 before the fuel enters adjustment tube 14.

In the calibrated fuel injector, adjustment tube 14 has been positioned axially to an axial location within fuel inlet tube 12 that compresses spring 20 to a desired bias force that urges the armature/needle valve such that the rounded tip end of needle valve 24 is seated on valve seat member 40 to close the central hole through the valve member seat. Preferably, tubes 14 and 12 are crimped together to maintain their relative axial positioning after adjustment calibration has been performed.

After passing through adjustment tube 14, fuel enters a space 62 that is cooperatively defined by confronting ends of inlet tube 12 and armature 22 and that contains spring 20. Armature 22 comprises a passageway 64 that communicates space 62 with a passageway 65 in valve body 30, and guide member 38 contains fuel passage holes 38A. This allows fuel to flow from space 62 through passageways 64, 65 to valve seat member 40. This fuel flow path is indicated by the succession of arrows in FIG. 1.

Non-ferromagnetic shell 26 is telescopically fitted on and joined to the lower end of inlet tube 12, as by a hermetic weld. Shell 26 has a tubular neck 66 that telescopes over a tubular neck 68 at the lower end of fuel inlet tube 12. Shell 26 also has a shoulder 69 that extends radially outwardly from neck 66. Shoulder 69 itself has a short circular rim 70 at its outer margin extending axially toward the nozzle end of the injector. Valve body shell 28 is ferromagnetic and is joined in fluid-tight manner to non-ferromagnetic shell 26, preferably also by a hermetic laser weld.

The upper end of valve body 30 fits closely inside the lower end of valve body shell 28 and these two parts are joined together in fluid-tight manner, preferably by laser welding. Armature 22 is guided by the inside wall of valve body 30 for axial reciprocation, specifically on the I.D. of an eyelet 67 that is attached to the upper end of valve body 30. Further axial guidance of the armature/needle valve assembly is provided by a central guide hole in member 38 through which needle valve 24 passes.

In the closed position shown in FIG. 1, a small working gap 72 exists between the annular end face of neck 68 of fuel inlet tube 12 and the confronting annular end face of armature 22. Coil housing 34 and tube 12 are in contact at 74 and constitute a stator structure that is associated with coil assembly 18. Non-ferromagnetic shell 26 assures that when coil 48 is energized, the magnetic flux will follow a path that includes armature 22. Starting at the lower axial end of housing 34, where it is joined with valve body shell 28 by a hermetic laser weld, the magnetic circuit extends through valve body shell 28, valve body 30 and eyelet 67 to armature 22, and from armature 22 across working gap 72 to inlet tube 12, and back to housing 34. When coil 48 is energized, the spring force on armature 22 is overcome and the armature is attracted toward inlet tube 12 reducing working gap 72. This unseats needle valve 24 from valve seat member 40 to open the fuel injector so fuel is now injected from the injector's nozzle. When the coil ceases to be energized, spring 20 pushes the armature/needle valve closed on valve seat member 40.

Fuel inlet tube 12 is shown to comprise a frustoconical shoulder 78 that divides its O.D. into a larger diameter portion 80 and a smaller diameter portion 82. Bobbin 46 comprises a central through-hole 84 that has a frustoconical shoulder 86 that divides the through-hole into a larger diameter portion 88 and a smaller diameter portion 90. Shoulder 86 has a frustoconical shape complementary to that of shoulder 78.

FIG. 1 shows shoulders 78 and 86 to be axially spaced apart, and it also shows a portion of through-hole 84 and a portion of the O.D. of fuel inlet tube 12 to be mutually axially overlapping. That overlapping portion of through-hole 84 consists of shoulder 86 and a portion of the larger diameter portion 88 of the through-hole immediately above shoulder 86. That overlapping portion of the O.D. of tube 12 consists of shoulder 78 and a portion of the smaller diameter portion 82 of the tube. The significance of this concerns steps in the process of assembling coil assembly 18, fuel inlet tube 12, and shells 26 and 28, as disclosed in the commonly assigned U.S. patent application Ser. No. 08/292,456 of Bryan C. Hall, "Coil for Small Diameter Welded Fuel Injector", filed on the same date. Reference may be had to that disclosure if the reader desires further details of that invention.

The present invention concerns cover 36 and the method of making it.

FIG. 3 shows cover 36 by itself with the following associated parts of the valve group in phantom outline: fuel inlet tube 12; coil assembly 18; housing 34; non-magnetic shell 26; and valve body shell 28. Cover 36 has a relatively thin cylindrical wall 36*d* circumferentially bounding the larger diameter body 34*a* of housing 34 that bounds coil assembly 18 and the immediately proximate rim of valve body shell 28. The cover wall thickens at 36*b* to cover the lower end of housing 34 and it extends slightly beyond this thickening, but at a reduced thickness 36*c* to cover a short portion of valve body shell 28, leaving the remainder of the valve body shell that extends below the termination of the cover wall exposed. This exposed portion of valve body shell 28 contains a radially outwardly open circumferential groove 37 forming a stepped lower cylinrdical wall for the power group. This groove 37 is used as a hold location when those portions of the power group represented by FIG. 3 are placed in a cavity of a mold that is shaped to mold the entirety of cover 36, and concurrently ring 58. The cavity into which the material that is used to form cover 36 is injected is thereby sealed off so that the injected material stops at the location where the cover wall is to terminate (36*c*). Because this hold location is on the outside of valve body shell 28, and not on its inside, the mold makes no contact with the inside of part 28, and hence the inside of the power group is not contaminated by the creation of the overmold cover 36. The fuel inlet tube 12 is also held around its outside by the mold and its interior sealed off so that contamination is not possible through this end of the power group.

The thickness of cover 36 where it surrounds the larger diameter portion 34*a* of housing 34 is preferably in the range from about 0.40 mm to about 0.95 ram. Although the stepped O.D. of the power group is in part 28 in this particular embodiment of fuel injector, it may be located in a different part in other embodiments. FIG. 1 shows that the upper edge of plastic shell 32 and the lower edge of cover 36 have complementary grooves 32*d*, 36*a* providing for the two parts 32, 36 to mutually axially overlap as shown.

While a presently preferred embodiment of the invention has been illustrated and described, it is to be appreciated that principles of the invention apply to all equivalent constructions and methods that fall within the scope of the following claims.

What is claimed is:

1. An electrically operated fuel injector for injecting fuel into an internal combustion engine comprising a fuel inlet via which fuel enters the fuel injector, a nozzle via which fuel is injected into an engine from the fuel injector, an internal passage within said fuel injector for conveying fuel that has entered said fuel inlet to said nozzle, at least a portion of said internal passage being within a metallic valve body structure of the fuel injector that contains said nozzle, a mechanism, comprising an electrical actuator and a valve, for selectively opening and closing said internal passage in accordance with selective energizing of said electrical actuator, a non-metallic cover on an exterior of said fuel injector having a sidewall extending axially in covering relation to said actuator and to a portion of a cylindrical metallic part that extends toward said nozzle and to which said valve body structure is joined, said sidewall of said non-metallic cover leaving another portion of said cylindrical metallic part exposed, and a groove extending circumferentially around an outside of said another portion of said cylindrical metallic part.

2. A fuel injector as set forth in claim 1 wherein a thickness of said cover sidewall is in a range from about 0.40 mm to about 0.95 mm.

3. A fuel injector as set forth in claim 1 wherein said actuator comprises a metallic housing having a cylindrical sidewall that axially overlaps an outside of said cylindrical metallic part, and said cover sidewall has increased thickness to cover an end edge of said cylindrical sidewall of said housing.

4. A fuel injector as set forth in claim 3 wherein said cover sidewall extends further beyond said end edge of said cylindrical sidewall of said housing and has reduced thickness so that said cover sidewall has a groove in a lower outer edge.

5. A method for making a power group of an electrically operated fuel injector, said power group comprising an electromagnetic coil that is circumferentially surrounded by a metallic housing that forms one part of an associated stator structure, a cylindrical metallic part that extends beyond said housing, and a nonmetallic cover circumferentially surrounding said metallic housing and an adjoining portion of said cylindrical metallic part, said method comprising providing a circumferentially extending groove in an exposed portion of said cylindrical metallic part that is disposed axially beyond said cover, and molding said cover onto said power group in a mold that holds an outside of said cylindrical metallic part at said groove.

* * * * *